US010227525B2

(12) United States Patent
Monroe et al.

(10) Patent No.: US 10,227,525 B2
(45) Date of Patent: Mar. 12, 2019

(54) RARE EARTH MATERIALS TO ENHANCE PROPERTIES OF CERAMIC PARTICLES

(71) Applicants: Terry D. Monroe, Tomball, TX (US);
Sumit Bhaduri, Spring, TX (US);
Harold G. Hudson, The Woodlands, TX (US)

(72) Inventors: Terry D. Monroe, Tomball, TX (US);
Sumit Bhaduri, Spring, TX (US);
Harold G. Hudson, The Woodlands, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 52 days.

(21) Appl. No.: 14/987,831

(22) Filed: Jan. 5, 2016

(65) Prior Publication Data
US 2017/0190958 A1 Jul. 6, 2017

(51) Int. Cl.
*C09K 8/80* (2006.01)

(52) U.S. Cl.
CPC .............. *C09K 8/80* (2013.01); *C09K 8/805* (2013.01)

(58) Field of Classification Search
CPC .................................. C09K 8/80; C09K 8/805
USPC .......................................................... 507/271
See application file for complete search history.

(56) References Cited

U.S. PATENT DOCUMENTS

| 4,879,181 A   * | 11/1989 | Fitzgibbon ............... | C09K 8/80  |
|                 |         |                            | 166/280.2  |
| 2003/0196800 A1 * | 10/2003 | Nguyen ................. | C09K 8/805 |
|                 |         |                            | 166/254.1  |
| 2006/0078682 A1 | 4/2006  | McDaniel et al.           |            |
| 2008/0135245 A1 | 6/2008  | Smith et al.              |            |
| 2008/0210421 A1 * | 9/2008  | Wilson .................... | C09K 8/80  |
|                 |         |                            | 166/254.1  |
| 2010/0074974 A1 | 3/2010  | Holland                   |            |
| 2010/0314108 A1 * | 12/2010 | Crews ...................... | C09K 8/50  |
|                 |         |                            | 166/250.12 |
| 2012/0211227 A1 | 8/2012  | Thaemlitz et al.          |            |
| 2014/0332213 A1 | 11/2014 | Zhou et al.               |            |
| 2014/0332214 A1 | 11/2014 | Zhou et al.               |            |
| 2015/0111063 A1 | 4/2015  | Khan et al.               |            |

FOREIGN PATENT DOCUMENTS

| WO | 2003054096 A1 | 7/2003 |
| WO | 2014120461 A1 | 8/2014 |

OTHER PUBLICATIONS

Product information sheet of SANTROL, 2017.*
(Continued)

*Primary Examiner* — Aiqun Li
(74) *Attorney, Agent, or Firm* — Cantor Colburn LLP

(57) ABSTRACT

A method of improving the flow of a proppant pack or gravel pack comprises: introducing into a subterranean formation or a well a plurality of ceramic particles, the ceramic particles comprising about 0.1 wt. % to about 25 wt. % of a rare earth-containing compound, based on the total weight of the ceramic particles; and forming a proppant pack or gravel pack comprising the plurality of the ceramic particles; wherein the proppant pack or gravel pack improves fluid flow as compared with a reference proppant pack or gravel pack formed from otherwise identical ceramic particles except for being free of the rare earth-containing compound.

22 Claims, 2 Drawing Sheets

(56) References Cited

OTHER PUBLICATIONS

Product Brochure of SANTROL, 2017.*
Bob Yirka, "Materials scientists create highly water repellabt ceramics (w/ video)" Phys Org, Nature Materials (2013); Jan. 21, 2013; pp. 1-2.
Kripa Varanasi, "Ceramics surprise with durable dryness" Nature 2013 Varanasi et al. & "materials scientist create highly repellant ceramics", Jan. 20, 2013; pp. 1-3.
Y. Wang, W. Chen, "Effect of ceria on the erosion resistance of HVOF thermal Sprayed NiAl intermetallic coatings", Department of Chemical and Materials Engineering, University of Alberta, Edmonton, Alberta, Canada, T6G2G6; Nov. 21, 2002; pp. 1-4.
International Search Report, International Application No. PCT/US2017/012243, dated Apr. 19, 2017, Korean Intellectual Property Office; International Search Report 5 pages.
International Written Opinion, International Application No. PCT/US2017/012243, dated Apr. 19, 2017, Korean Intellectual Property Office; International Written Opinion 7 pages.

* cited by examiner

RARE EARTH MATERIALS TO ENHANCE PROPERTIES OF CERAMIC PARTICLES

BACKGROUND

Particles are often used in various downhole applications such as hydraulic fracturing and gravel packing operations. Hydraulic fracturing is a process used to increase the flow of desirable fluids, such as oil and gas, from a portion of a subterranean formation. Hydraulic fracturing operations generally involve pumping fracturing fluids (high viscosity crosslinked or a low viscosity fluid) at high rates and placing the fluids into a subterranean formation or zone at a rate and pressure sufficient to cause the formation or zone to break down with the attendant production of a fracture.

Once the fracture is initiated, a fluid carries and transports particles such as proppants into the created fracture. The proppants form a proppant pack, which functions to prevent the fracture from fully closing upon the release of pressure. The proppant pack also provides a higher permeability zone than the surrounding rock so that hydrocarbons and/or other formation fluids can flow into the wellbore through conductive channels provided by the proppant pack. The higher the flow rate, the greater is the potential for the production of hydrocarbons. Accordingly, it is desirable to provide proppant packs that improve fluid flow in order to enhance the production of hydrocarbons from the fractured subterranean formation.

In addition, particles can also be used as gravel packs. Gravel packing treatments are used to reduce the migration of unconsolidated formation particles into a well bore. In gravel packing operations, the particles suspended in a carrier fluid are pumped into a well bore in which the gravel pack is to be placed. After the carrier fluid leads off into the formation, the particles forms a gravel pack. A gravel pack can act as a filter to separate formation particles from produced fluids while permitting the produced oil and/or gas to flow to the well bore. A gravel pack having high flow capacity is desired as such gravel pack allows for a higher production rate.

BRIEF DESCRIPTION

A method of improving fluid flow of a proppant pack or gravel pack comprises: introducing into a subterranean formation or a well a plurality of ceramic particles comprising about 0.1 wt. % to about 25 wt. % of a rare earth-containing compound, based on the total weight of the ceramic particles; and forming a proppant pack or gravel pack comprising the plurality of the ceramic particles; wherein the proppant pack or gravel pack improves fluid flow as compared with a reference proppant pack or gravel pack formed from otherwise identical ceramic particles except for being free of the rare earth-containing compound.

A treatment fluid comprises a plurality of ceramic particles, the ceramic particles comprising about 0.1 wt. % to about 25 wt. % of a rare earth-containing compound based on the total weight of the ceramic particles, wherein the rare earth-containing compound comprises one or more of the following: scandium; yttrium; lanthanum; cerium; praseodymium; neodymium; promethium; samarium; lutetium; europium; gadolinium; terbium; dysprosium; holmium; erbium; thulium; or ytterbium.

BRIEF DESCRIPTION OF THE DRAWINGS

Referring now to the drawings wherein like elements are numbered alike in the several Figures.

DETAILED DESCRIPTION

Figure 1A:
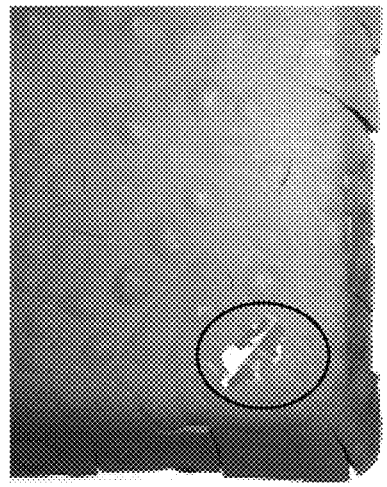
FIG. 1A is an image of a water drop treated blank ceramic coupon (control)

It has been found that rare earth-containing materials can be used to alter the properties of ceramic particles. Advantageously, rare earth-containing materials provide a hydrophobic, low friction surface that increases flow capacity of a proppant pack or a gravel pack formed from the particles. Without wishing to be bound by theory, it is believed that rare earth elements have a unique electron structure with a "full set" in the outer shell and not full 4f orbital, which results in desirable hydrophobic properties. The rare earth-containing compounds also provide self-cleaning properties to the ceramic particles because of the lotus effect, resulting in a reduced drag to recover fluids. As a further advantageous feature, the rare earth-containing compound improves the mechanical strength of the proppant pack and gravel pack. Rare earth-containing materials can also function as antioxidants thus the ceramic particles containing rare earth-containing compounds are less susceptible to corrosion and results in reduced particle diagenesis over the life of the well.

As used herein, proppants and gravels include ceramic particles comprising about 0.1 wt. % to about 25 wt. % of a rare earth-containing compound. In an embodiment, the rare earth materials are concentrated on the surface of the ceramic particles, for example, greater than about 50 wt. %, greater than about 60 wt. %, greater than about 80 wt. %, or greater than about 90 wt. % of the rare earth materials are concentrated on the surface of the ceramic particles. In another embodiment, the rare earth-containing compound forms a coating on the ceramic particles.

Examples of the ceramic particles include particles comprising one or more of the following: an oxide-based ceramic; a nitride-based ceramic; a carbide-based ceramic; a boride-based ceramic; or a silicide-based ceramic. In an embodiment, the oxide-based ceramic is silica ($SiO_2$), titania ($TiO_2$), aluminum oxide, boron oxide, potassium oxide, zirconium oxide, magnesium oxide, calcium oxide, lithium oxide, phosphorous oxide, and/or titanium oxide, or a combination thereof. The oxide-based ceramic, nitride-based ceramic, carbide-based ceramic, boride-based ceramic, or silicide-based ceramic contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), or halogen (e.g., fluorine, chlorine, and the like). Exemplary ceramics include zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or a combination thereof.

The rare earth-containing compound comprises one or more of the following: scandium; yttrium; lanthanum; cerium; praseodymium; neodymium; promethium;

samarium; lutetium; europium; gadolinium; terbium; dysprosium; holmium; erbium; thulium; or ytterbium, preferably the rare earth-containing compound comprises cerium or lanthanum.

The rare earth-containing compound is present in the form of oxides, halides, hydroxides, carbonates, sulfates, nitrates, acetates, or a combination comprising at least one of the foregoing. In an embodiment, the rare earth-containing compound comprises one or more of the following: cerium oxide; cerium chloride; cerium bromide; cerium hydroxide; cerium carbonate; cerium sulfate; cerium nitrate; cerium ammonium nitrate; or cerium acetate. Cerium oxide, cerium hydroxide (also known as cerium hydrate), and cerium chloride are specifically mentioned. The composition can include two or more rare earth-containing compounds. These minerals are often obtained by mining and typically the ores come in a mixtures of various rare earth materials. Such compounds can contain the same or different rare earth elements and can contain mixed valence or oxidation states. By way of example, when the rare earth-containing compound comprises a cerium oxide, the compound can comprise one or more cerium oxides such as $CeO_2$ (IV) and $Ce_2O_3$ (III).

The ceramic particles can be manufactured by any methods known in the art used to prepare conventional ceramic proppants with the exception that one or more rare earth-containing compounds disclosed herein are further added to the starting materials to make the conventional ceramic proppants. This is in addition to the extremely small % of rare earths that may be present in conventional proppants (<0.01%). For example, bauxite, kaolin, clays, alumina, silica, aluminosilicates (e.g., mullite, cordierite), or a combination comprising at least one of the foregoing and one or more rare earth-containing compound can be mixed, homogenized, and pelletized forming the ceramic particles.

In an embodiment, the ceramic particles comprise or are derived from bauxite, kaolin, clays, alumina, silica, aluminosilicates (e.g., mullite, cordierite), or a combination comprising at least one of the foregoing and at least one rare earth-containing compound. In a specific embodiment, the ceramic particles comprise or are derived from alumina and aluminosilicates such as mullite, cordierite, or a combination thereof, and at least one of rare earth-containing compound.

In an exemplary embodiment, the ceramic particles are formed from a composition containing 40 wt. % to 60 wt. % of alumina, 35 wt. % to 55 wt. % of silica, 0.5 to 5 wt. % or 0.6 wt. % to 5 wt. % of a rare earth-containing compound such as cerium oxide or cerium hydroxide or a combination thereof, and optionally 0.5 wt. % to 10 wt. % of titania, each based on the total amount of the composition. In another specific example, the ceramic particles are formed from a composition comprising 45 wt. % to 55 wt. % of alumina, 40 wt. % to 50 wt. % of silica, 1 wt. % to 5 wt. % of titania, and 0.5 wt. % to 5 wt. % or 0.6 wt. % to 5 wt. % of a rare earth-containing compound such as a cerium oxide, a cerium hydroxide, or a combination thereof.

For the embodiment where the rare earth-containing compound forms a coating on a surface of the ceramic particles, the coating can be conducted in a batch or in a continuous process. The ceramic particles can be coated with a single layer in a single coating application, or the ceramic particles can be coated with multiple layers of the same coating material, such as, two, three, four, five, or more layers. When coating the ceramic particles, the coating materials including the rare earth containing material or a precursor thereof can be dissolved or suspended in a solvent and then applied to the ceramic particles. The solvent is subsequently evaporated forming the proppants coated with a rare earth-containing compound. This process may be repeated one or more times to produce multiple layers of the same or different coating materials surrounding the ceramic particle.

Ceramic particle can also be coated using the method as described in WO 03/054096, which comprises mixing a water soluble low valence rare earth metal salt (precursor) with ceramic particles and an oxidant, carrying out an oxidization reaction preferably in an alkaline environment to convert the precursor to water insoluble high valence rare earth-containing compound. The formed insoluble rare earth-containing compound deposits on a surface of the ceramic particles forming a coating. Using cerium as an example, the precursors include any cerium-containing compound, which can be used to form cerium-containing material on ceramic particles. Such precursors include e. g. metallic cerium, cerium salts such as cerium (III) acetate, cerium (III) acetate hydrate, cerium (III) bromate, cerium (III) fluoride, cerium (III) chloride, cerium (III) iodate, cerium (III) iodide, cerium (III) nitrate, ceric ammonium nitrate, cerium (III) oxalate, cerium (III) 2, 4-pentanedione, cerium (III) metaphosphate, cerium (III) orthophosphate, cerium (III) salicylate, cerium (III) selenate, cerium (III) sulfate, hexaantipyrinecerium (III) iodide, preferably cerium (III) nitrate or cerium (III) sulfate.

The oxidizing agent may be hydrogen peroxide, oxygen, ozone, hypochlorite, hypobromide or other halogens or oxidized halogen compounds, or mixtures thereof. Hydrogen peroxide is specifically mentioned. In an embodiment, the oxidizing agent is present in an aqueous dispersion.

The coating process can be carried out in an alkaline environment, i. e. at a pH higher than about 7. Exemplary alkaline solutions include ammonia, alkali metal hydroxide such as sodium hydroxide, potassium hydroxide, lithium hydroxide, ammonium hydroxide, amines, quaternary hydroxides as well as other nitrogen containing alkaline compounds and mixtures thereof.

Other methods of coating the ceramic particles include spray coating (for example, top, bottom, or side spray coating), drum coating, pan coating, fluid bed coating, continuous pour coating, or any other method known to those of ordinary skill in the art.

Optionally, in any of the foregoing embodiments, the coating or individual layers are disposed directly on the particle core or other layers, that is, no intervening layers are present other than those described. The coatings and layers can be continuous or discontinuous. To optimize the controlled flow properties of the proppant, the coating covers greater than about 50%, greater than about 60%, or about 80% to about 100% of the surface area of the particle core.

The thickness of the coating layer is adjusted to provide the desired controlled flow properties of the proppant pack. In an embodiment, the total thickness of the coating is about 0.1 to about 50 micrometers. Within this range, the thickness may be greater than or equal to about 0.5 micrometer, or greater than or equal to 1 micrometers. Also within this range the thickness may be less than or equal to 25, or less than or equal to 10 micrometers.

The rare earth-containing compound is present in an amount of about 0.1 wt. % to about 25 wt. %, 0.1 wt. % to 15 wt. %, 0.5 wt. % to about 15 wt. % or about 0.6 wt. % to about 10 wt. % or about 0.7 wt. % to about 5 wt. % based on the total weight of the proppant. When the rare earth-containing compound is present in an amount of less than about 0.6 wt. % or less than 0.5 wt. %, it is believed that the proppant pack or gravel pack formed from such ceramic particles may not have any detectable improvement in fluid flow as compared with a reference proppant pack or gravel pack formed from otherwise identical ceramic particles except for being free of the rare earth-containing compound. When the rare earth-containing compound is coated on a surface of the ceramic particles, lower amount of rare earth-containing compound may be needed in order to improve the fluid flow in a proppant pack or gravel pack. For example, the rare earth-containing compound coated on a surface of the ceramic particles can be present in an amount of about 0.1 wt. % to about 20 wt. % or about 0.5 to about 15 wt. % or about 0.5 to about 10 wt. %, each based on the total weight of the proppants.

The proppant particles have a size from 1 µm to 2500 µm, specifically 10 µm to 1000 µm, and more specifically 10 µm to 800 µm. In another embodiment, the proppant particles have a size from 6 mesh to 200 mesh, preferably from 10 mesh to 140 mesh, more preferably from 20 mesh to 70 mesh. Further, the proppant particles have any shape including spherical, angular, and polyhedral and are monodisperse or polydisperse with an average particle size distribution that is unimodal or multimodal, e.g., bimodal.

The ceramic particles disclosed herein can be used in applications where conventional ceramic particles are used, for example, the ceramic particles can be used as proppants or gravels.

In the instance where the ceramic particles are proppants, the proppants are delivered to a fracture in a subterranean formation via a treatment composition. As the fracturing fluid leaks off into the formation, dehydrating the fluid, proppants aggregate forming proppant packs within the fracture. In the treatment composition, the proppant particles are present in an amount effective to prop open the fracture. In a particular embodiment, the proppant particles are present in a mass concentration from 0.1 pounds per gallon (lb/gal) to 20 lb/gal, specifically 0.25 lb/gal to 16 lb/gal, and more specifically 0.25 lb/gal to 12 lb/gal, based on the total volume of the fluid composition.

In an embodiment, the treatment composition carrying and transporting the proppants is a hydraulic fracturing composition. The hydraulic fracturing compositions can further comprise other components known for use in fracturing compositions, for example a viscosifier, a viscosifier crosslinker, a pH control agent, a surfactant, a breaker, a lubricant, a fluid loss agent, a clay stabilizer, a biocide, an acid, a corrosion inhibitor, an oxygen scavenger, or a combination comprising at least one of the foregoing. These additional components are selected to avoid imparting unfavorable characteristics to the hydraulic fracturing composition, to avoid damage to equipment in contact with the fracturing composition, and to avoid damaging the wellbore or subterranean formation. The additives as well as the amounts of the additives are known and have been described for example in U.S. 2014/03322123 and U.S. 2014/0332214.

In another embodiment, the ceramic particles can be used in a gravel packing operation. In gravel packing operations, the ceramic particles suspended in a carrier fluid are pumped into a well in which the gravel pack is to be placed. The carrier fluid leaks off into the subterranean zone and/or is returned to the surface while the ceramic particles are left in the subterranean zone. The resultant gravel pack acts as a filter to separate formation sands from produced fluids while permitting the produced oil and/or gas to flow into the well bore. Because the ceramic particles disclosed herein contain about 0.1 to about 25 wt. % of a rare earth-containing compound, the gravel pack improves fluid flow thus increase the production of hydrocarbon and gas as compared with a reference gravel pack formed from otherwise identical particles except for being free of the rare earth-containing compound.

EXAMPLES

Ceramic coupons (16 in$^2$; 335 g weight) were prepared using the following procedure. Chemical compositions of the prepared coupons ranged from alumina (46-54%); silica (40-49%); titania (2%) and cerium oxide (0.5%-5%) or cerium hydrate (0.5%-5%). The ceramic slurry was initially prepared by weighing out the raw materials (silica, alumina and titania) and mixing them with water to obtain the desired % solids and then blunged for 10 mins. While blunging, the rare earth sourced chemical (cerium oxide or hydrate) was added (in the control sample this step was omitted) and subsequently the slurry was screened through a 325 mesh sieve screen, binder added mixed for 5 mins and the slurry poured on a plaster of pairs mold and let sit for 24 h. Afterwards, the coupons were demolded, air dried for 8 h and then placed in a drier for 24 h at 140° F. The coupons were then taken out of the dryer. A kiln was set to the desired firing conditions. The coupons were transferred to the kiln and fired (final set temperatures ranged from 1450° C. to 1650° C.). After completion, the coupons were taken out of the kiln and tested. Control coupons were also prepared without added cerium oxide for comparison purposes.

Figure 1B:
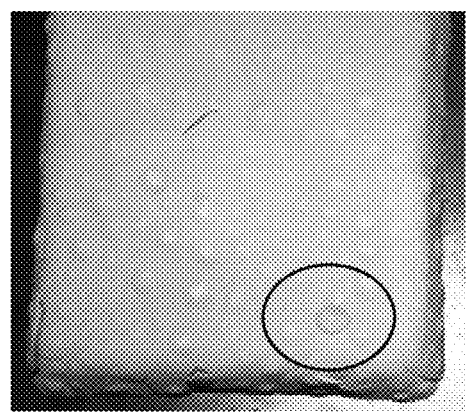
FIG. 1B is an image of a water drop treated ceramic coupon containing 1 wt. % of cerium.
Figure 2:
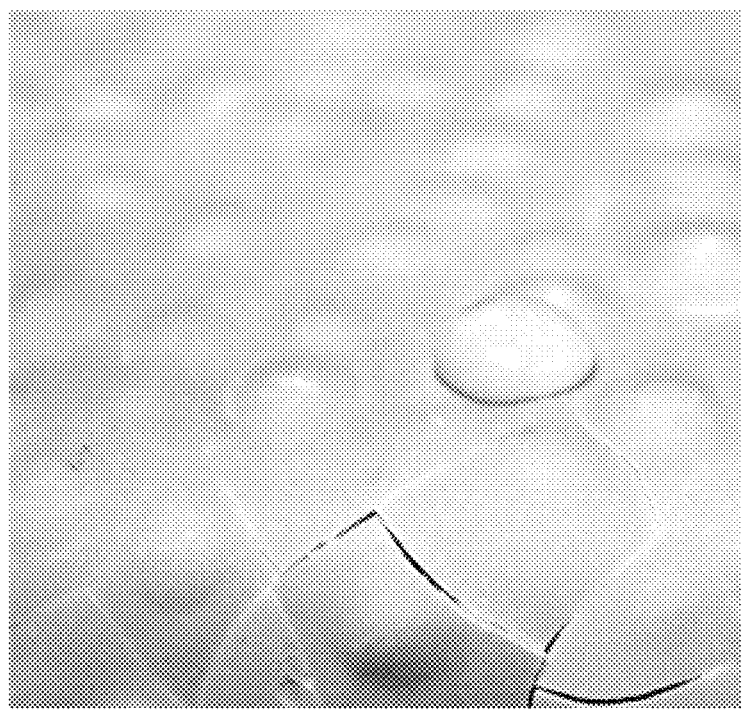
FIG. 2 is an image of a water drop on a ceramic coupon having cerium incorporated showing the increased hydrophobicity achieved by the addition of cerium.

The ability for the cerium included compositions to improve fluid recovery was tested using an imbibition test method. In this test, a specific volume of water (100 µL) was gently placed as a drop on the coupon surface and a timer started. The time taken for the drop to imbibe on to the coupon matrix was noted and indicated in Table 1. Images of water drop treated coupons are shown in FIGS. 1A, 1B, and 2.

TABLE 1

| | Control Ceramic Coupon | 1% by wt. Rare earth Incorporated Ceramic Coupon |
|---|---|---|
| Imbibition time | 20.1 secs | >60 mins |

As shown in Table 1, the water drop was absorbed by the control coupon in 20 seconds. In contrast, the water drop was absorbed by the ceramic coupon containing 1 wt. % of a cerium compound in greater than 60 minutes, indicating that the incorporation of a cerium compound greatly improves the hydrophobicity of ceramic coupons. The increased hydrophobicity has also been demonstrated in FIGS. 1A, 1B, and 2.

Further included in this disclosure are the following specific embodiments, which do not necessarily limit the claims.

Embodiment 1

A method of improving fluid flow in a proppant pack or gravel pack, the method comprising:

introducing into a subterranean formation or a well a plurality of ceramic particles, the ceramic particles containing about 0.1 wt. % to about 25 wt. % of a rare earth-containing compound, based on the total weight of the ceramic particles; and forming a proppant pack or gravel pack comprising the ceramic particles;

wherein the proppant pack or gravel pack improves fluid flow as compared with a reference proppant pack or gravel pack formed from otherwise identical particles except for being free of the rare earth-containing compound.

Embodiment 2

The method of Embodiment 1, wherein the rare earth-containing compound comprises one or more of the following: scandium; yttrium; lanthanum; cerium; praseodymium; neodymium; promethium; samarium; lutetium; europium; gadolinium; terbium; dysprosium; holmium; erbium; thulium; or ytterbium.

Embodiment 3

The method of Embodiment 1 or Embodiment 2, wherein the rare earth-containing compound comprises one or more of cerium or lanthanum.

Embodiment 4

The method of any one of Embodiments 1 to 3, wherein the rare earth-containing compound comprises one or more of the following: cerium oxide; cerium chloride; cerium bromide; cerium hydroxide; cerium carbonate; cerium sulfate; cerium nitrate; cerium ammonium nitrate; or cerium acetate.

Embodiment 5

The method of any one of Embodiments 1 to 4 where greater than 50 wt. % of the rare earth-containing compound are concentrated on the surface of the ceramic particles.

Embodiment 6

The method of any one of Embodiments 1 to 5, wherein the rare earth-containing compound is present in an amount of about 0.1 wt. % to about 5 wt. % based on the total weight of the proppants.

Embodiment 7

The method of any one of Embodiments 1 to 6, wherein the rare earth-containing compound forms a coating disposed on a surface of the ceramic particles.

Embodiment 8

The method of Embodiment 7, wherein the coating has a thickness of about 0.1 to about 50 micrometers.

Embodiment 9

The method of Embodiment 7 or Embodiment 8, wherein the coating covers at least greater than about 50% surface area of the ceramic particles.

Embodiment 10

The method of any one of Embodiments 1 to 9, wherein the ceramic particles comprise one or more of the following: an oxide-based ceramic; a nitride-based ceramic; a carbide-based ceramic; a boride-based ceramic; or a silicide-based ceramic.

Embodiment 11

The method of any one of Embodiments 1 to 10, wherein the ceramic particles comprise or are derived from a composition comprising the rare earth-containing compound and one or more of the following: bauxite; kaolin; clays; alumina; silica; or aluminosilicates.

Embodiment 12

The method of any one of Embodiments 1 to 11, wherein the ceramic particles have an average size of about 1 micron to about 2,500 microns.

Embodiment 13

The method of any one of Embodiments 1 to 12, wherein the ceramic particles are introduced to a fracture of the subterranean formation via a treatment fluid.

Embodiment 14

The method of Embodiment 13, further comprising forming the fracture in the subterranean formation.

Embodiment 15

A treatment fluid comprising a plurality of ceramic particles, the ceramic particles comprising about 0.1 wt. % to about 25 wt. % of a rare earth-containing compound, wherein the rare earth-containing compound comprises one or more of the following: scandium; yttrium; lanthanum; cerium; praseodymium; neodymium; promethium; samarium; lutetium; europium; gadolinium; terbium; dysprosium; holmium; erbium; thulium; or ytterbium.

Embodiment 16

The treatment fluid of Embodiment 15, wherein the rare earth-containing compound comprises one or more of the following: cerium oxide; cerium chloride; cerium bromide; cerium hydroxide; cerium carbonate; cerium sulfate; cerium nitrate; cerium ammonium nitrate; or cerium acetate.

Embodiment 17

The treatment fluid of Embodiment 15 or Embodiment 16, wherein the ceramic particles comprise or are derived from a composition comprising at least one rare earth-containing compound and one or more of the following: bauxite; kaolin; clays; alumina; silica; or aluminosilicates.

Embodiment 18

The treatment fluid of any one of Embodiments 15 to 17, wherein the rare earth-containing compound forms a coating disposed on a surface of the ceramic particles.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, it should further be noted that the terms "first," "second," and the like herein do not denote any order, quantity (such that more than one, two, or more than two of an element can be present), or importance, but rather are used to distinguish one element from another. The modifier "about" used in connection with a quantity is inclusive of the stated value and has the meaning dictated by the context (e.g., it includes the degree of error associated with measurement of the particular quantity). Unless defined otherwise, technical and scientific terms used herein have the same meaning as is commonly understood by one of skill in the art to which this invention belongs. As used herein, the size or average size of the particles refers to the largest dimension of the particles and can be determined by high resolution electron or atomic force microscope technology.

All references cited herein are incorporated by reference in their entirety. While typical embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A method of improving fluid flow in a proppant pack or gravel pack, the method comprising:
introducing into a subterranean formation or a well a plurality of ceramic particles, the ceramic particles containing 0.7 wt. % to 10 wt. % of a rare earth-containing compound, based on the total weight of the ceramic particles; and
forming a proppant pack or gravel pack comprising the ceramic particles;
wherein the rare earth-containing compound comprises halides, nitrates, acetates, or a combination comprising at least one of the foregoing; and
the proppant pack or gravel pack improves fluid flow as compared with a reference proppant pack or gravel pack formed from otherwise identical particles except for being free of the rare earth-containing compound.

2. The method of claim 1, wherein the rare earth-containing compound comprises one or more of the following: scandium; yttrium; lanthanum; cerium; praseodymium; neodymium; promethium; samarium; lutetium; europium; gadolinium; terbium; dysprosium; holmium; erbium; thulium; or ytterbium.

3. The method of claim 1, wherein the rare earth-containing compound comprises one or more of cerium or lanthanum.

4. The method of claim 1, wherein the rare earth-containing compound comprises one or more of the following: cerium chloride; cerium bromide; cerium nitrate; cerium ammonium nitrate; or cerium acetate.

5. The method of claim 1 where greater than 50 wt. % of the rare earth-containing compound are concentrated on the surface of the ceramic particles.

6. The method of claim 5, wherein the rare earth-containing compound is present in an amount of about 0.7 wt. % to about 5 wt. % based on the total weight of the proppants.

7. A method of improving fluid flow in a proppant pack or gravel pack, the method comprising:
introducing into a subterranean formation or a well a plurality of ceramic particles, the ceramic particles containing 0.7 wt. % to 20 wt. % of a rare earth-containing compound, based on the total weight of the ceramic particles; and
forming a proppant pack or gravel pack comprising the ceramic particles;
wherein the rare earth-containing compound comprises halides, nitrates, acetates, or a combination comprising at least one of the foregoing;
the rare earth-containing compound forms a coating having a thickness of about 0.1 to about 50 micrometers disposed on a surface of the ceramic particles; and
the proppant pack or gravel pack improves fluid flow as compared with a reference proppant pack or gravel pack formed from otherwise identical particles except for being free of the rare earth-containing compound.

8. The method of claim 7, wherein the coating has a thickness of about 0.1 to about 25 micrometers.

9. The method of claim 7, wherein the coating covers at least greater than about 50% surface area of the ceramic particles.

10. The method of claim 1, wherein the ceramic particles comprise one or more of the following: an oxide-based ceramic; a nitride-based ceramic; a carbide-based ceramic; a boride-based ceramic; or a silicide-based ceramic.

11. The method of claim 1, wherein the ceramic particles comprise or are derived from a composition comprising the rare earth-containing compound and one or more of the following: bauxite; kaolin; clays; alumina; silica; or aluminosilicates.

12. The method of claim 1, wherein the ceramic particles have an average size of about 1 micron to about 2,500 microns.

13. The method of claim 1, wherein the ceramic particles are introduced to a fracture of the subterranean formation via a treatment fluid.

14. The method of claim 7, wherein the coating has a thickness of about 0.1 to about 10 micrometers.

15. The method of claim 7, wherein the coating formed by the rare earth-containing compound is directly coated on the ceramic particles.

16. The method of claim 7, wherein the rare earth-containing compound further comprises cerium oxide, cerium hydroxide, or a combination thereof.

17. The method of claim 4, wherein the rare earth-containing compound further comprises cerium oxide, cerium hydroxide, or a combination thereof.

18. The method of claim 1, wherein the rare earth-containing compound comprises halides, nitrates, or a combination comprising at least one of the foregoing.

19. The method of claim 7, wherein the ceramic particles comprises 0.7 wt. % to 10 wt. %, of the rare earth-containing compound based on the total weight of the ceramic particles.

20. The method of claim 7, wherein the rare earth-containing compound comprises one or more of the following: cerium chloride; cerium bromide; cerium nitrate; cerium ammonium nitrate; or cerium acetate.

21. A method of improving fluid flow in a proppant pack or gravel pack, the method comprising:
introducing into a subterranean formation or a well a plurality of ceramic particles, the ceramic particles containing 45 wt. % to 55 wt. % of alumina, 40 wt. % to 50 wt. % of silica, 1 wt. % to 5 wt. % of titania, and 0.7 wt. % to 5 wt. % of a rare earth-containing compound, based on the total weight of the ceramic particles; and
forming a proppant pack or gravel pack comprising the ceramic particles;
wherein the rare earth-containing compound comprises one or more of the following: cerium oxide; cerium chloride; cerium bromide; cerium hydroxide; cerium carbonate; cerium sulfate; cerium nitrate; cerium ammonium nitrate; or cerium acetate; and
the proppant pack or gravel pack improves fluid flow as compared with a reference proppant pack or gravel pack formed from otherwise identical particles except for being free of the rare earth-containing compound.

22. The method of claim 7, wherein the coating consists of the rare earth-containing compound.

* * * * *